March 11, 1924.  1,486,535

T. B. MUNROE

HEAT INSULATING PLASTER BOARD

Filed April 21, 1923   2 Sheets-Sheet 1

Inventor
T. B. Munroe
by
J. A. Witherspoon
Attorney

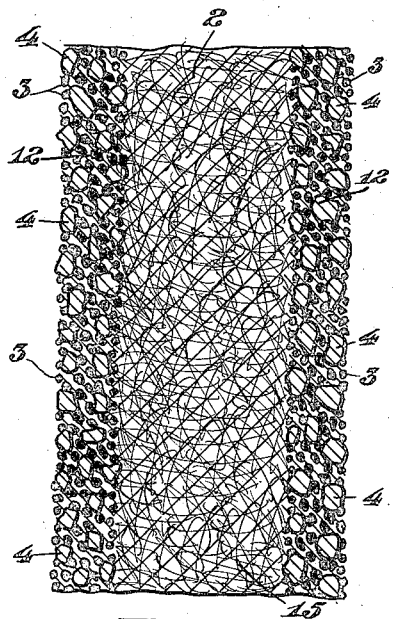
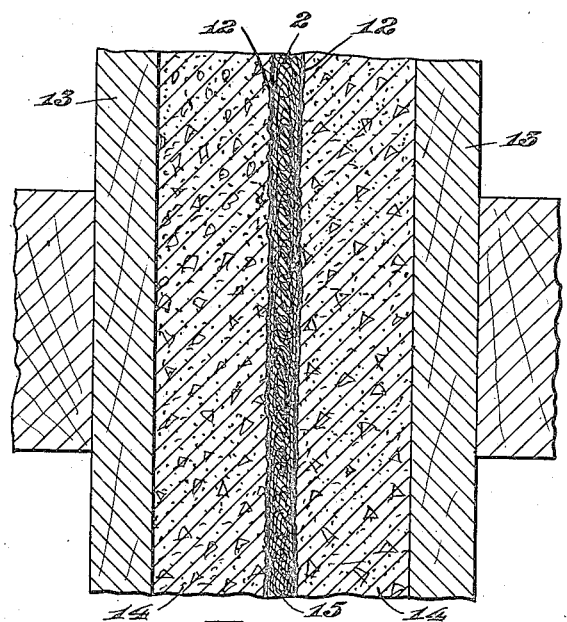
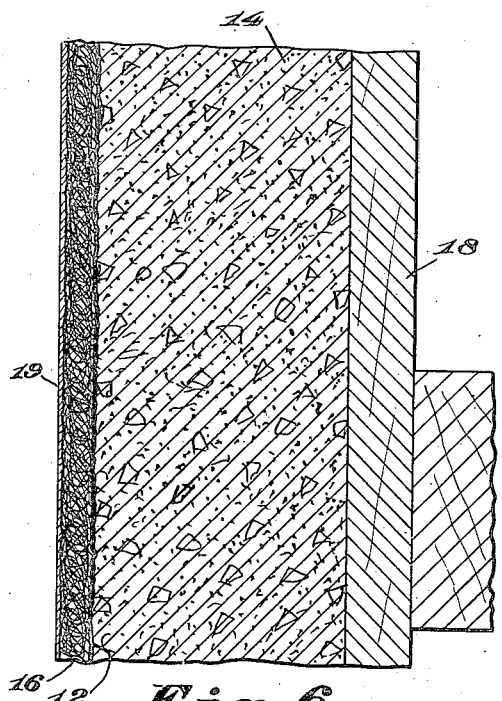
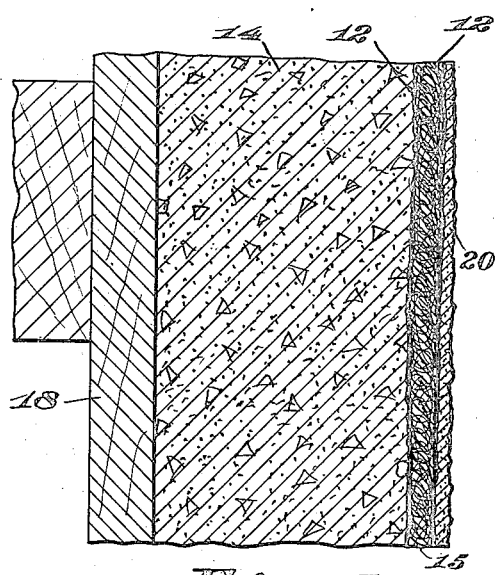

Patented Mar. 11, 1924.

1,486,535

UNITED STATES PATENT OFFICE.

TREADWAY B. MUNROE, OF FOREST GLEN, MARYLAND.

HEAT-INSULATING PLASTER BOARD.

Application filed April 21, 1923. Serial No. 633,764.

*To all whom it may concern:*

Be it known that I, TREADWAY B. MUNROE, a citizen of the United States, residing at Forest Glen, in the county of Montgomery and State of Maryland, have invented certain new and useful Improvements in Heat-Insulating Plaster Boards; and I do hereby declare the following to be a full, clear, and exact description of the invention, such as will enable others skilled in the art to which it appertains to make and use the same.

This invention relates to heat insulating plaster boards especially adapted for holding stucco and like materials, and has for its object to improve the somewhat similar boards heretofore proposed.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:

Figure 4 is an enlarged sectional view of a somewhat modified form of board having the asphalt material applied to both sides thereof;

Figure 5 is a diagrammatic sectional view showing how the board shown in Figure 4 may serve as a heat insulator in walls of plastic material;

Figure 6 is a view similar to Figure 5, showing the application of the form of board shown in Figure 1 to the outside of plastic walls, pillars, etc.; and Figure 7 is a view similar to Figure 6, showing the application of the form of board shown in Figure 4 to the inside of houses made of cement, the outside of walls, pillars, etc.

Figure 1:
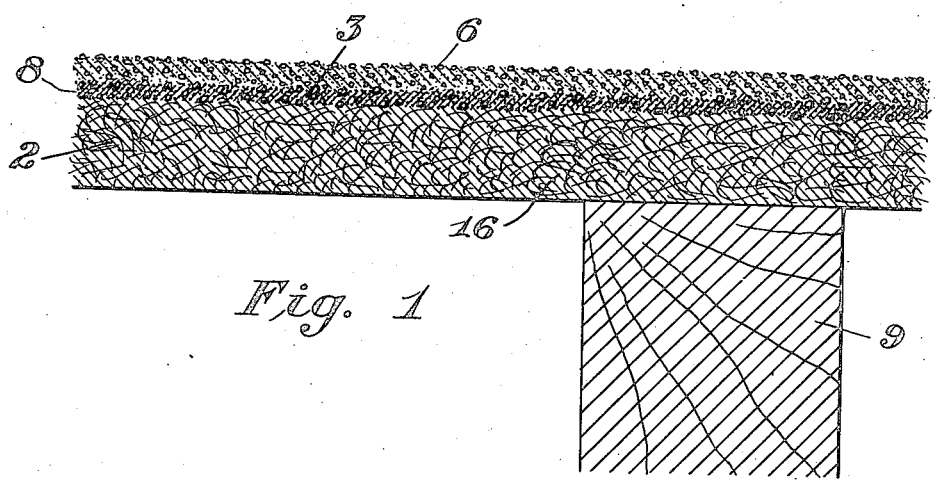
Figure 1 is a heat insulating stucco or plaster board made in accordance with this invention.
Figure 2:
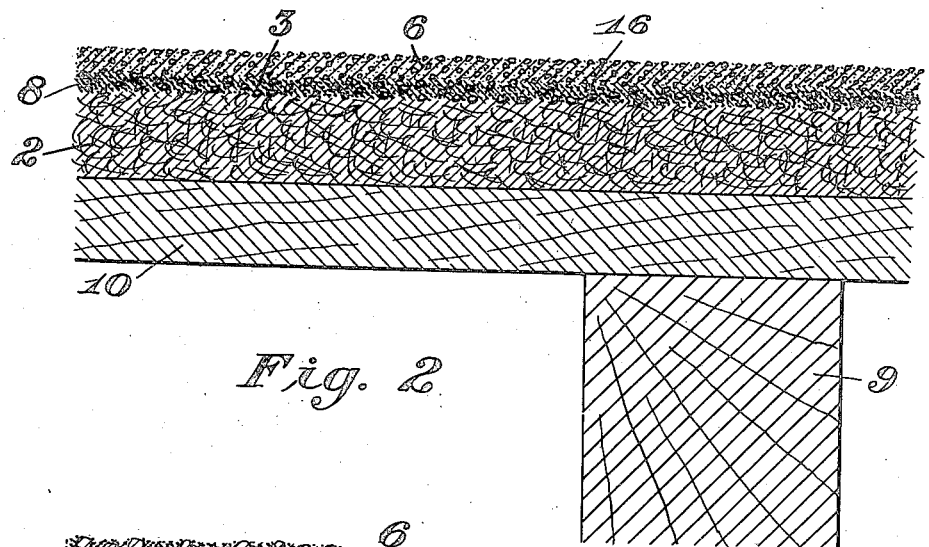
Figure 2 is a view similar to Figure 1, showing the board supported by a wooden base.
Figure 3:
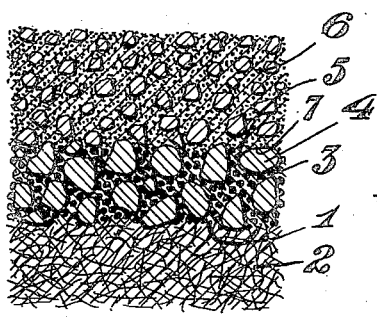
Figure 3 is an enlarged detail sectional view illustrating the bonding of the stucco like material to the asphalt base.

In order that the precise invention may be clearly understood, it is said: There is at present on the market a wall covering known as "Celotex", which has a very high heat insulating capacity, and which is made from partially cooked thread like bagasse fibers interlaced with each other into a coherent sheet like mass having great tensile strength. Its specific gravity is less than 0.6, and its heat insulating capacity is substantially equal to that of cork. In preparing these partially cooked bagasse fibers, the cooking is stopped at such a point as will prevent the cellular structure from breaking down, and therefore the full strength of the original raw fibers is retained. In these respects these said fibers differ radically from those adapted for use in making paper. In fact, these fibers differ both chemically and physically from paper making fibers, and therefore the finished board likewise differs both chemically and physically from a board made of paper. Plaster adheres to the fibrous surface of this sheet material, but cement stuccos and concrete do not adhere thereto as well as could be desired. On the other hand, asphalt, and pitch like substances adhere to this "Celotex" material exceptionally well. Concrete in addition to not bonding satisfactorily with "Celotex" is alkaline in character, and is found to destroy in time the strength of the fibers when applied directly thereto. But cement and cement stucco will bond satisfactorily to asphalt provided the surface of the asphalt is free from dust. Therefore, in carrying out this invention, I coat the fibrous surface 1 of the heat insulating "Celotex" material 2 with a layer of asphalt or like material 3. I then embed in said asphalt small pieces 4 of crushed rock capable of passing a sieve of say one eighth of an inch mesh or finer, or I may embed in said asphalt fine gravel or coarse sand. Instead of embedding these materials after the coating operation, I may mix them with the asphalt like material 3, and apply the mixture to the fibrous "Celotex" material. The surface 5 of the asphalt 3 is next freed from dust and the cement stucco 6 is applied directly to the said asphalt surface, when it is found that a firm bond is had between the surfaces of the cement material and the asphalt material and that the cement material 6 adheres strongly to the surfaces 7 of the rock material 4.

It will be seen that by providing the asphalt layer on the surface of the fibrous "Celotex" I am enabled to obtain a strong bond between the "Celotex" and the asphalt, and a stronger bond between the cement of the stucco and the asphalt. Also, by providing the rock material 4 in the asphalt I increase the bonding surface of the cement and likewise obtain a strong bond between the latter and said rock material. The result is a heat insulating stucco board 8 which may be secured directly to the studding 9, or it may be secured to the sheathing 10 or to any other suitable support.

In the somewhat modified form of the invention shown in Figure 4, the construction of the heat insulating board is the same as in the preceding figures, except the asphalt and rock material layers 3 and 4 are applied to both sides of the Celotex material 2, instead of to one side only. This construction of board having a layer 12 on each side thereof of asphalt and rock material has a number of advantages, as will be clear from the following: In Figure 5 the "Celotex" material 2 with its two coats 12 of asphalt and finely divided rock material is placed inside the form 13, and concrete, cement, or other plastic material 14 is poured in on opposite sides of said "Celotex" 2, whereupon the cement bonds firmly to said coats or layers 12 with the result that the finished board 15 after the form is removed serves to heat insulate the wall, or roof, or other structure formed by the cement 14. In Figure 6, the finished board 16 is made in accordance with Figure 1, and provided with only one layer 12 of asphalt and rock material. Said board is so placed as to constitute one side of the form 18 with said layer 12 on the inside thereof, whereupon cement 14 or other plastic is poured into said form and becomes firmly bonded to said layer 12. The other side of said board 16 becomes the outside surface of the wall or other structure 14, and may be ornamented or plastered on as indicated by the layer 19. In this case, the cement 14 may well be the wall of a house, when the Celotex would not only serve as a heat insulating lining on the inside of said wall, but could be plastered on, painted or otherwise ornamented. In Figure 7, the construction is substantially the same as in Figure 6, except the Celotex is coated on both sides to form a board 15, as in Figures 4 and 5, and this said board is placed on the outside surface of the wall 14, which may be the wall of a house. In this case, the outer layer 12 of asphalt and stone material may be given a layer of stucco 20 or other cementitious material, whereupon the house would be heat insulated as before with a stucco outer covering.

In addition to this, the majority of stucco boards now on the market have the disadvantage of expanding and contracting to such an extent under changes of temperature, as to crack the stucco. In this board, on the other hand, the fibrous bagasse board is so porous that it expands and contracts so very little that it does not crack the stucco under the widest temperature changes. Further, it is so compressible or yielding that it actually gives under the strains set up during the setting of the stucco and the hardening of the asphalt, and no cracking of the stucco follows. Another advantage flows from the compressible nature of the fibrous bagasse base in the fact that it yields sufficiently when the building settles slightly to prevent cracking of the stucco.

What I claim is:

1. A heat insulating wall board composed of a heat insulating fibrous bagasse supporting member adapted to bond with asphalt and pitch like materials, but not adapted to satisfactorily bond with cement and concrete like substances, and a layer of asphalt material mixed with finely divided rock material bonded to said bagasse member.

2. In a heat insulating wall board, the combination of a sheet of insulating fibrous bagasse material adapted to bond with asphalt and pitch like materials, but not adapted to satisfactorily bond with cement and concrete like substances; and a layer consisting of crushed rock and asphalt, covering one surface of and bonded to said sheet.

3. A heat insulating wall board composed of a heat insulating fibrous bagasse supporting member adapted to bond with asphalt and pitch like materials, but not adapted to satisfactorily bond with cement and concrete like substances, and a layer of asphalt material mixed with finely divided rock material bonded to said bagasse member on each side thereof.

4. In a heat insulating wall board, the combination of a sheet of insulating fibrous bagasse material adapted to bond with asphalt and pitch like materials, but not adapted to satisfactorily bond with cement and concrete like substances; and a layer consisting of crushed rock and asphalt, covering both surfaces of and bonded to said sheet.

5. A wall composed of cement material; a heat insulating bagasse material adapted to bond with asphalt and pitch like materials, but not adapted to satisfactorily bond with cement and concrete like substances; associated with said wall; and a layer of asphalt in which is embedded finely divided rock material bonded to said cement and bagasse materials.

6. A wall composed of cement material; a heat insulating bagasse material adapted to bond with asphalt and pitch like materials, but not adapted to satisfactorily bond with cement and concrete like substances associated with said wall; and a layer of asphalt in which is imbedded finely divided rock material on each side of said heat insulating material and bonded to said cement and bagasse materials.

In testimony whereof I affix my signature.

TREADWAY B. MUNROE.